(12) United States Patent
Liu et al.

(10) Patent No.: US 9,438,849 B2
(45) Date of Patent: Sep. 6, 2016

(54) SYSTEMS AND METHODS FOR TRANSMITTING VIDEO FRAMES (71) Applicant: Dolby Laboratories Licensing Corporation, San Francisco, CA (US)

(72) Inventors: Limin Liu, Cupertino, CA (US); Ning Xu, Irvine, CA (US); Alfred She, Toluca Lake, CA (US); James E. Crenshaw, Burbank, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 466 days.

(21) Appl. No.: 14/054,090

(22) Filed: Oct. 15, 2013

(65) Prior Publication Data
US 2014/0104492 A1 Apr. 17, 2014

Related U.S. Application Data (60) Provisional application No. 61/715,235, filed on Oct. 17, 2012.

(51) Int. Cl.

| | | |
|---|---|---|
| *H04N 7/01* | (2006.01) | |
| *H04N 5/38* | (2006.01) | |
| *H04N 19/30* | (2014.01) | |
| *H04N 19/37* | (2014.01) | |
| *H04N 19/132* | (2014.01) | |
| *H04N 19/587* | (2014.01) | |
| *H04N 21/2343* | (2011.01) | |
| *H04N 21/236* | (2011.01) | |
| *H04N 21/434* | (2011.01) | |
| *H04N 21/6379* | (2011.01) | |
| *H04N 19/467* | (2014.01) | |
| *H04N 21/84* | (2011.01) | |

(52) U.S. Cl.
CPC .............. *H04N 7/01* (2013.01); *H04N 5/38* (2013.01); *H04N 7/0127* (2013.01); *H04N 19/132* (2014.11); *H04N 19/30* (2014.11); *H04N 19/37* (2014.11); *H04N 19/587* (2014.11); *H04N 21/23614* (2013.01); *H04N 21/234327* (2013.01); *H04N 21/4348* (2013.01); *H04N21/6379* (2013.01); *H04N 19/467* (2014.11); *H04N 21/84* (2013.01)

(58) Field of Classification Search
CPC combination set(s) only.
See application file for complete search history.

(56) References Cited

U.S. PATENT DOCUMENTS

| | | |
|---|---|---|
| 5,742,343 A | 4/1998 | Haskell |
| 6,639,943 B1 | 10/2003 | Radha |

(Continued)

FOREIGN PATENT DOCUMENTS

| | | |
|---|---|---|
| WO | 2004/012455 | 2/2004 |
| WO | 2012/166512 | 12/2012 |

OTHER PUBLICATIONS

Schwarz, H. et al. "Overview of the Scalable Video Coding Extension of the H.264/AVC Standard" IEEE Transactions on Circuits and Systems for Video Technology, vol. 17, No. 9, Sep. 2007, pp. 1103-1120.

*Primary Examiner* — Behrooz Senfi
*Assistant Examiner* — Asmamaw G Tarko (57) ABSTRACT

Systems and methods for transmitting video frames are described. Specifically, frame rate modification techniques such as blending and/or packing processes are used to translate high frame-rate signals into low-frame rate signals, which are transmitted over limited bandwidth transmission media to a video signal receiver. Information pertaining to the blending and/or packing processes is transferred to the video signal receiver in the form of a map that is used to reconstruct the high frame-rate signals from the low-frame rate signals. The high frame-rate signals may be used by certain types of newer equipment designed to use such signals. However, legacy equipment that cannot use the high frame-rate signals may opt to use certain embodiments described herein that are designed to be backward-compatible. When backward-compatible, the video signal receiver generates suitable low frame-rate signals as well as the high frame-rate signals, thereby accommodating both legacy as well as newer equipment.

12 Claims, 5 Drawing Sheets

(56) References Cited

U.S. PATENT DOCUMENTS

| | | |
|---|---|---|
| 6,728,317 B1 | 4/2004 | Demos |
| 7,082,164 B2 | 7/2006 | Chaddha |
| 2005/0195897 A1 | 9/2005 | Cha |
| 2006/0013313 A1 | 1/2006 | Han |
| 2007/0223582 A1 | 9/2007 | Borer |
| 2011/0182354 A1 | 7/2011 | Jang |

SYSTEMS AND METHODS FOR TRANSMITTING VIDEO FRAMES

CROSS REFERENCE TO RELATED APPLICATIONS

This application claims the benefit of priority to U.S. Provisional Application Ser. No. 61/715,235 filed on Oct. 17, 2012, which is hereby incorporated by reference in its entirety.

TECHNICAL FIELD

The present teachings relate to transmitting high frame-rate video signals. In particular, some of the present teachings relate to systems and methods for transmitting high-frame rate video signals to newer equipment, and are backward-compatible with legacy equipment having limited frame-rate processing capabilities.

BACKGROUND

Cost constraints and technology limitations have historically inhibited the deployment of video systems incorporating high frame rates. Consequently, for example, the legacy infrastructure for propagating television signals and displaying these signals in a television set uses a relatively low 30/60 frames per second (fps). However, it is highly desirable to use high frame rate video because of various benefits provided by these high frame rates. Such benefits include significant reduction in undesirable artifacts such as motion blur and judder that are often present in existing video reproduction systems.

Unfortunately, even though video processing technology has advanced to a point where high frame rate video systems (such as 240 fps systems) are technologically feasible at a reasonable cost; such evolved video systems face other constraints that cannot be reasonably ignored. For example, the bandwidth limitations that are inherently present in existing transmission infrastructure (cable, wireless etc.) and in legacy video reproduction equipment (older/existing television sets, movie projectors etc.) cannot be reasonably ignored when deploying high frame rate video systems because such an action would result in a loss of revenue derived from a significant number of such legacy applications.

It is therefore desirable to provide solutions that not only allow newer display devices to receive and display high frame rate video but also permit legacy devices to receive and display high frame rate video at a lower frame rate that can be accommodated by such legacy equipment.

DETAILED DESCRIPTION

Throughout this description, embodiments and variations are described for the purpose of illustrating uses and implementations of the inventive concept. The illustrative description should be understood as presenting examples of the inventive concept, rather than as limiting the scope of the concept as disclosed herein. For example, it will be understood that description provided below with respect to one aspect of processing a signal at a transmitting end may be similar or identical to processing operations at a receiving end. In other words, certain functional blocks in multiple figures are shown as having the same reference numeral. A person of ordinary skill in the art will understand that the functionality of these various functional blocks may be exactly identical to each other or may incorporate certain differences directed at accommodating the overall functionality of the system. For example, the nature of the signal processed in a functional block labeled as "encoder" (reference numeral 140) in FIG. 1 may be different from the nature of the signal processed in a similarly labeled block in FIG. 2. However, persons of ordinary skill in the art will understand the intent behind labeling these blocks in an identical manner in the context of the systems illustrated in the two figures.

It will also be understood that certain words are used herein as a matter of convenience and should be interpreted accordingly. For example, it will be understood that the word "encoder" that is used herein can be equally well interpreted as a unit that provides signal "compression." Similarly, the word "decoder" can be understood to represent a "decompressing" action that is an alternative way at viewing a decoding action, and the word "line" can be understood to indicate various types of connecting media such as wires, printed circuit board (PCB) tracks, cable, wireless links, optical fiber links etc. Furthermore, various concepts and methods disclosed herein are equally applicable to various fields and applications other than those described herein. For example, the high frame-rate signals and low frame-rate signals described herein using certain values (240 fps and 60 fps respectively) are equally applicable to various types of signals having various types of frame repetition rates (300 fps, 360 fps, 24 fps, 30 fps etc.) as well as repetitive parameters other than frame repetition rate.

In general, the various embodiments described herein provide some examples of video systems that incorporate video frame rate modification techniques to translate high frame-rate signals into low-frame rate signals using frame blending and/or frame packing processes at a transmitting element (a video signal transmitter, for example). The low-frame rate signals are then transmitted over limited bandwidth transmission media to a receiving element (a video signal receiver, such as a Digital Camera Initiative (DCI) receiver, for example). Information pertaining to the blending and/or packing processes is transferred to the receiving element in the form of a map that is used by the receiving element to reconstruct the high frame-rate signals from the low-frame rate signals. The high frame-rate signals may be used by certain types of newer equipment designed to use these signals. However, legacy equipment that cannot use the high frame-rate signals may opt to use the low frame-rate signals instead and ignore the high frame-rate signals. Thus, the video systems described herein in accordance with various embodiments of the invention may be directed exclusively at newer equipment or may be directed at providing high frame-rate signals to newer equipment while simultaneously providing backward compatibility with legacy equipment.

Figure 1:
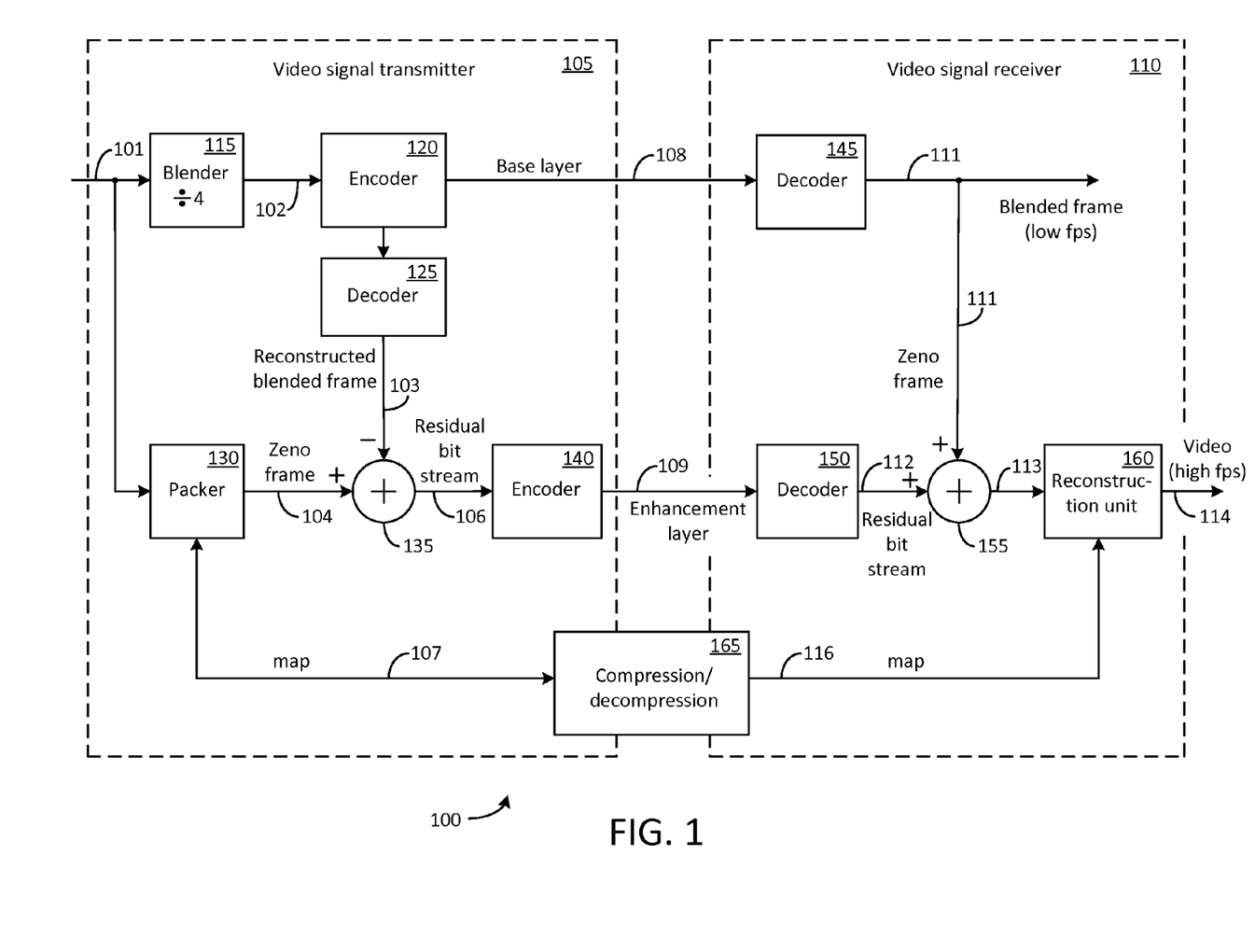
FIG. 1 shows a backward-compatible video system in accordance with a first embodiment of the invention.

FIG. 1 shows a backward-compatible video system 100 in accordance with a first embodiment of the invention. In this embodiment, a high frame-rate signal, say a 240 fps signal, is down-converted to a low frame-rate signal, say a 60 fps signal, which can be propagated over transmission media 108 and 109 from video signal transmitter 105 to video signal receiver 110.

More particularly, a high frame-rate input signal is provided via line 101 to blender 115, which generates a blended frame by decimating the high frame-rate input signal temporally. In one embodiment, a certain number of neighboring high frame-rate frames is averaged to derive one low frame rate frame. For example, in this example embodiment, four of the high frame-rate signal frames at 240 fps are averaged to obtain a single low frame-rate frame at 60 fps. This averaging procedure may be mathematically derived in the following manner.

Let the pixel value for the i-th frame at position row x and column y in the 240 fps rate signal be denoted by $p_i(x, y)$. Then the pixel value for the i-th frame at the 60 fps rate is derived as follows:

$$b_i(x,y) = (p_{4i}(x,y) + p_{4i+1}(x,y) + p_{4i+2}(x,y) + p_{4i+3}(x,y))/4 \quad \text{(Eqn. 1)}$$

In an alternative derivation, $$b_i(x,y) = (w_1 p_{4i}(x,y) + w_2 p_{4i+1}(x,y) + w_3 p_{4i+2}(x,y) + w_4 p_{4i+3}(x,y))/(w_1 + w_2 + w_3 + w_4) \quad \text{(Eqn. 2)}$$

The weighted parameters of Eqn. 2 can be set to one particular value for the whole frame, or can be changed adaptively for example, based on certain spatial characteristics of images in the video frames, or a temporal location of one or more pixels within a group of frames, the group of frames obtained by temporally partitioning the high frame-rate input signal. In one implementation, only a single of the $w_i$ coefficients (i=1 to 4) is set to a non-zero value (e.g., $w_j$) and the low frame-rate is derived by retaining only one frame of the four frames of the high frame-rate signal. A more general form of interpolation can be defined for an arbitrary start time and an arbitrary shutter angle, for example.

The blended frames are provided by blender 115 to encoder 120 via line 102. Various types of encoders and encoding technologies can be employed. In one example embodiment, encoder 120 is a JPEG2000 encoder. In other embodiments, encoder 120 can be conforming to one or more standards such as MPEG2, H.264/AVC, HEVC etc. Encoder 120 encodes/compresses the blended frames and provides a low frame-rate signal (at 60 fps) as a base layer signal that is carried from video signal transmitter 105 to video signal receiver 110 via transmission medium 108. At video signal receiver 110, the base layer signal is decoded/decompressed by decoder 145. When encoder 120 is a JPEG2000 encoder, decoder 145 is a corresponding JPEG2000 decoder. The output of decoder 145 is propagated via line 111 as a low frame-rate blended frames signal to a legacy element (not shown) such as an older television set. It will be understood that providing this low frame-rate blended frames signal from video signal receiver 110 constitutes the backwards-compatibility feature in accordance with the invention.

Providing of a high frame-rate signal from video signal receiver 110 will now be described in further detail. Towards this end, attention is drawn back to the high frame-rate input signal provided to video signal transmitter 105 via line 101. In addition to coupling this signal into blender 115, the high frame-rate input signal is also provided to packer 130. Packer 130 packs the high frame-rate input signal at 240 fps into a low frame-rate signal at 60 fps. The low frame-rate signal is referred to herein as a Zeno frames signal stream.

Generation of Zeno frame signals from a high frame-rate input signal has been disclosed in a previously submitted patent application No. PCT/US2012/039338, filed on May 24, 2012, titled "*Method and System for Video Compression Implementing Resolution Tradeoffs and Optimization and Reconstruction of Video from a Compressed Representation,*" (inventors A. She, J. Crenshaw, N. Xu, L. Liu, S. Daly, K. Stec, and S. Hulyalkar) that is commonly assigned to the same entity (Dolby Labs) as the present disclosure. Application No. PCT/US2012/039338, is incorporated herein by reference, in its entirety.

In accordance with a class of embodiments for packing input frames into Zeno frames, an input picture my first be sub-divided into regions. The perceptually best rate for each region of a sequence of input video frames is determined, and encoded versions of the pixels from each region are packed into a sequence of encoded frames that contains only an optimized number of pixels. For instance, the input video may be 1920 pixel×1080 pixel progressive frames updated at 120 frames per second. One embodiment would identify the regions that look best at 120 fps but at quarter spatial resolution, those that look best at 60 fps but at half spatial resolution, and those that look best at 30 fps with at full resolution, and encode the input pixels in each region accordingly (with different encoding for different ones of the regions), and then pack the encoded pixels into encoded frames. The total pixel rate of the encoded video is thus only 1920×1080 multiplied by 30 frames per second (one quarter of the input video frame rate), but the encoded video retains much more of the motion detail than a conventionally generated 30 fps sequence (e.g., a sequence of every fourth one of the input frames) would have.

Of course a reconstruction element at the receiving end would need to unpack the encoded frames and reconstruct images for display at the correct display rate. Thus, it is necessary to signal to the reconstruction element when an image region (determined by the encoded video) has a different update rate than another image region. This can be done in several ways, including by providing a separate map with the encoded pixels, or by including special pixel values that signal changes in update rate. The reconstruction element would use such a map (or special pixel values) to know how many frame updates are supplied by the encoded data for each region. From this it can deduce spatial resolution of each region and can construct updated decoded frames using a variety of straightforward re-sampling techniques.

The Zeno frames signal stream at 60 fps is provided by packer 130 to combiner/differentiator 135 via line 135. Combiner/differentiator 135 compares the Zeno frames signal stream with a reconstructed blended frames signal that is provided via line 103. The reconstructed blended frames signal is generated by decoder 125 from the base layer signal provided to decoder 125 from encoder 120. The output of combiner/differentiator 135 is a residual bit stream, which is provided to encoder 140 via line 106. As mentioned above, various types encoding technologies can be employed in encoder 140.

In one example embodiment, encoder 140 is a JPEG2000 encoder. Encoder 140 encodes/compresses the residual bit stream and provides a low frame-rate signal (at 60 fps) as an enhancement layer signal that is carried from video signal transmitter 105 to video signal receiver 110 via transmission medium 109. At video signal receiver 110, the enhancement layer signal is decoded/decompressed by decoder 150. When encoder 140 is a JPEG2000 encoder, decoder 150 is a corresponding JPEG2000 decoder. The output of decoder 150 is propagated via line 112 as a low frame-rate signal (60 fps) comprising a recovered residual bit stream to a combiner 155.

Combiner 155 combines the recovered residual bit stream with the low frame-rate blended frames signal generated by decoder 145 and provided to combiner 155 via line 111. The output signal of combiner 155 is a reconstructed Zeno frames signal that is provided to a reconstruction unit 160, where the reconstructed Zeno frames signal is unpacked using a decision map received via line 116. The unpacked signal is a high frame-rate video signal that is propagated out of video signal receiver 110 via line 114 and can be provided to newer equipment (not shown) that are located either inside video signal receiver 110 or external to video signal receiver 110, and is designed to accommodate the high frame-rate video signal (240 fps). Reconstruction of Zeno frame signals has been disclosed in Application No. PCT/US2012/039338 that is mentioned above and incorporated herein by reference.

The decision map used by reconstruction unit 160 is generated by packer 130 in video signal transmitter 105 and provided to reconstruction unit 160 as one of a lossless, near lossless signal, or lossy signal. Transmitting the decision map from video signal transmitter 105 to video signal receiver 110 (indicated by the block labeled compression/decompression 165) via link 107 can include compression/decompression procedures in some implementations. The decision map provides spatial and temporal resolution information about the Zeno frames signal stream.

If the decision map is transmitted using lossy compression, a decoded version of the map is sent back via link 107 to packer 130 from compression/decompression 165. The decoded version is used by packer 130 to generate the Zeno frame carried on line 104. This action is in contrast to using the high frame-rate input signal provided via line 101. Furthermore, in a first example implementation, decision map may be smoothed in order to reduce the size of the compressed map. Also, various error resilience methods may be incorporated when using the decision map. In a second example implementation, reconstruction unit 160 may receive a decision map that has undergone corruption. The corrupted map is used by reconstruction unit 160. However, reconstructed frames produced by reconstruction unit 160 are then rectified using continuity information derived from images. In a third example implementation, reconstruction unit 160 uses a reconstructed decision map that is related to the reconstructed Zeno frames signal and down-samples predicted Zeno frames to help fine-tune the decision map. This process may involve several iterations using multiple reconstructed Zeno frames and multiple decision maps.

Figure 2:
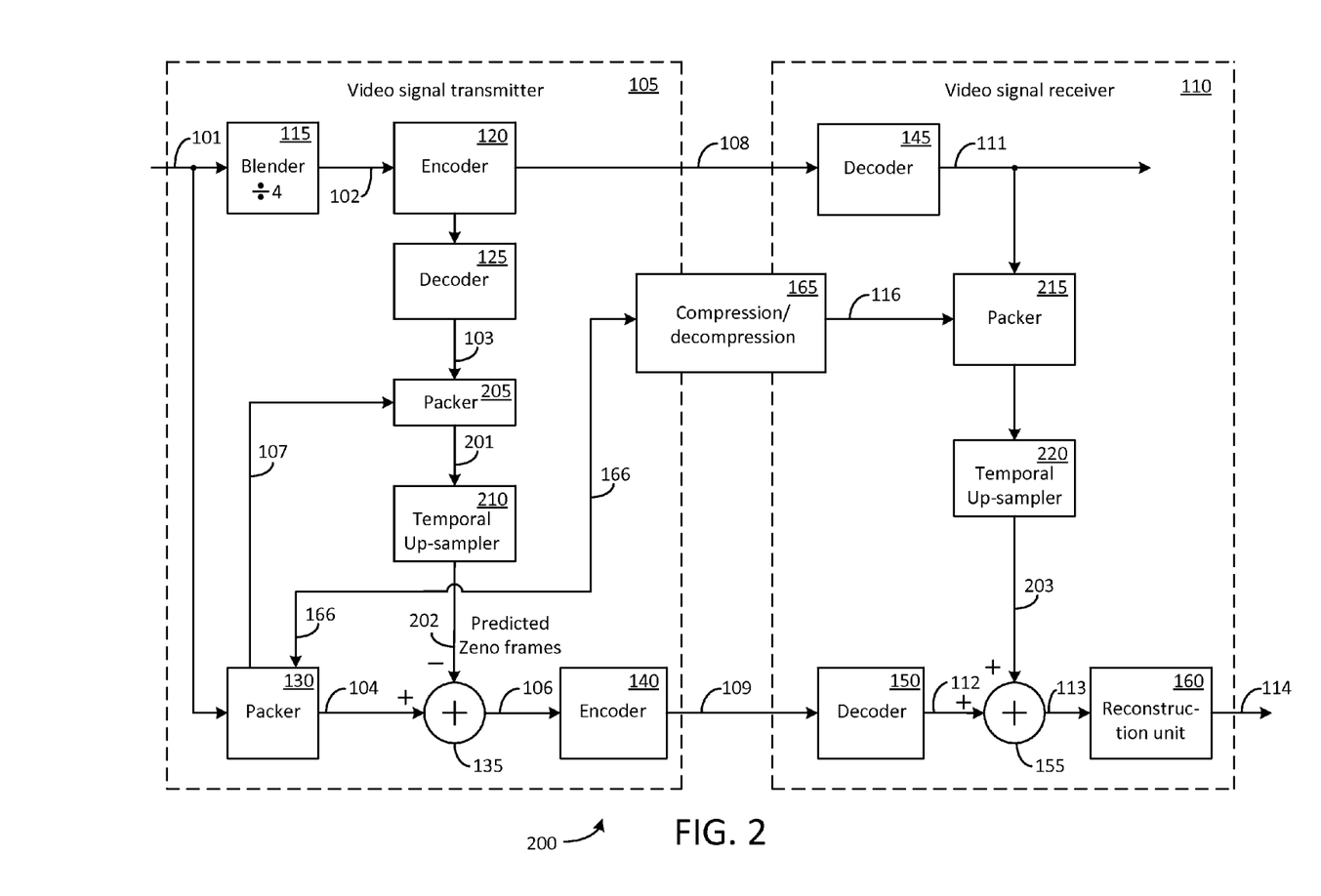
FIG. 2 shows a backward-compatible video system in accordance with a second embodiment of the invention.

Attention is next drawn to FIG. 2, which shows a backward-compatible video system 200 in accordance with a second embodiment of the invention. Similar to the first embodiment, a high frame-rate signal, say a 240 fps signal, is down-converted to a low frame-rate signal, say a 60 fps signal, which can be propagated over transmission media 108 and 109 from video signal transmitter 105 to video signal receiver 110. More particularly, the base layer is generated and used in the same manner as described above in the first embodiment. However, in contrast to the first embodiment, in this second embodiment, the enhancement layer generation and usage is carried out in a different manner by incorporating predicted Zeno frames.

The predicted Zeno frames are derived from the base layer signal, by routing the output of decoder 125 to packer 205 and from there on to up-sampler 210. Packer 205 accepts reconstructed blended frames signal (60 fps) that is provided via line 103 and packs the reconstructed blended frames to generate a predicted Zeno frames signal on line 201. The decision map provided to packer 205 is used to carry out the generation. In this embodiment (same as in the first embodiment), packer 130, which generates the decision map utilizes a factor of 4 to generate Zeno frames signal (240/4=60 fps) on line 104. The same factor comes into play in packer 205 as well, thereby resulting in the predicted Zeno frames signal on line 201 being at 15 fps (60/4 fps). The 15 fps predicted Zeno frames signal provided via line 201 is temporally up-sampled to 60 fps by up-sampler 210.

The up-sampled predicted Zeno frames signal is provided via line 202 to combiner/differentiator 135, which outputs (on line 106) the difference between the predicted Zeno frames signal (60 fps) and the Zeno frames signal (60 fps) provided via line 104. This difference signal constitutes the residual bit stream carried on line 106 to encoder 140 and from there, via transmission medium 109, to decoder 150 in video signal receiver 110.

The decision map generated in packer 130 is propagated from packer 130 to packer 205 via link 107. The decision map is further propagated as a lossless, near lossless signal, or lossy signal from video signal transmitter 105 to video signal receiver 110. Transmitting the decision map from video signal transmitter 105 to video signal receiver 110 (indicated by block 165) can include compression/decompression procedures in some implementations. Furthermore, in a manner similar to the one used in the first embodiment, if the decision map is transmitted using lossy compression, a decoded version of the map is sent back from compression/decompression 165 to packer 130 via bi-directional link 166. However, in contrast to the first embodiment, in this second embodiment, the decision map is provided in video signal receiver 110 to packer 215. Packer 215 uses this decision map to process the low frame-rate blended frames signal provided via line 111, and generate therefrom, a reconstructed blended frames signal at 15 fps. This 15 fps signal is temporally up-sampled in temporal up-sampler 220 to generate a predicted Zeno frames signal (60 fps) on line 203. Combiner 155 combines the predicted Zeno frames signal (provided via line 203) with the recovered residual bit stream (provided via line 112) to generate a reconstructed Zeno frames signal on line 113. Reconstruction unit 160 accepts the reconstructed Zeno frames signal from line 113 and unpacks this signal to generate the high frame-rate video signal that is propagated out of video signal receiver 110 via line 114.

Figure 3:
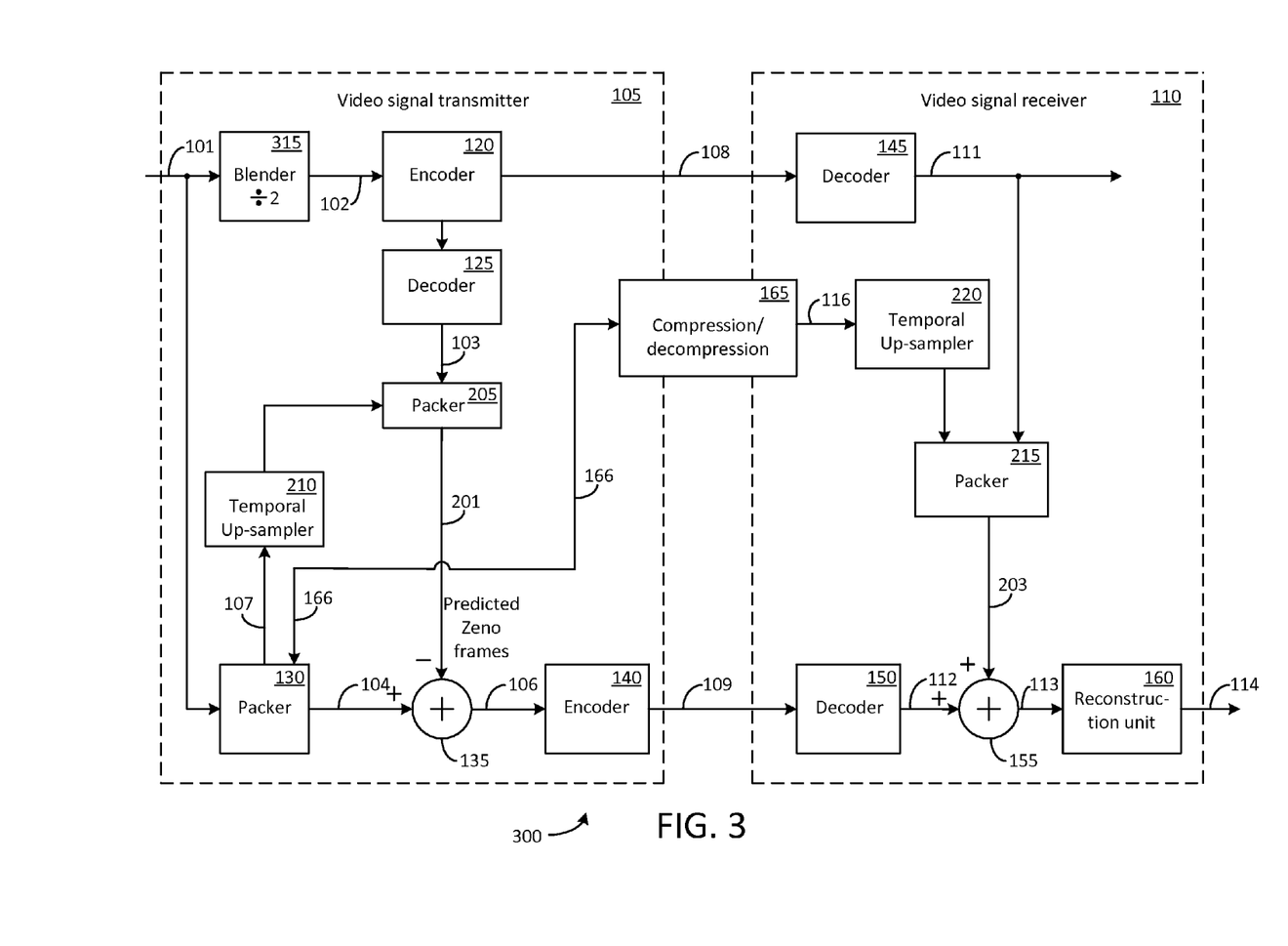
FIG. 3 shows a backward-compatible video system in accordance with a third embodiment of the invention.

FIG. 3 shows a backward-compatible video system 300 in accordance with a third embodiment of the invention. While many aspects of this embodiment are similar or identical to that of the second embodiment, in this example embodiment, the coded base layer signal operates at 60 fps, and the decision map is upsampled prior to use in each of packer 205 (transmitting end) and packer 215 (receiving end).

More particularly, the base layer at 60 fps is generated by providing the high frame-rate input signal (120 fps) to blender 315 via line 101. Blender 315 utilizes a factor of 2 (rather than 4 that is described above in the averaging procedure associated with blender 115) thereby generating the blended frames at 60 fps, which are provided to encoder 120 for producing the base layer signal on transmission medium 108.

As for the decision map generated in packer 130, temporal up-sampler 210 upsamples using a factor of 2, thereby producing the 60 fps map information for use by packer 205 in generating the predicted Zeno frames signal at 60 fps on line 201. Combiner/differentiator 135 and encoder 140 operate in the way described above using FIG. 2. At the receiving end, in video signal receiver 110, the map carried over line 116 is temporally upsampled to 60 fps by up-sampler 220 and provided to packer 215.

Figure 4:
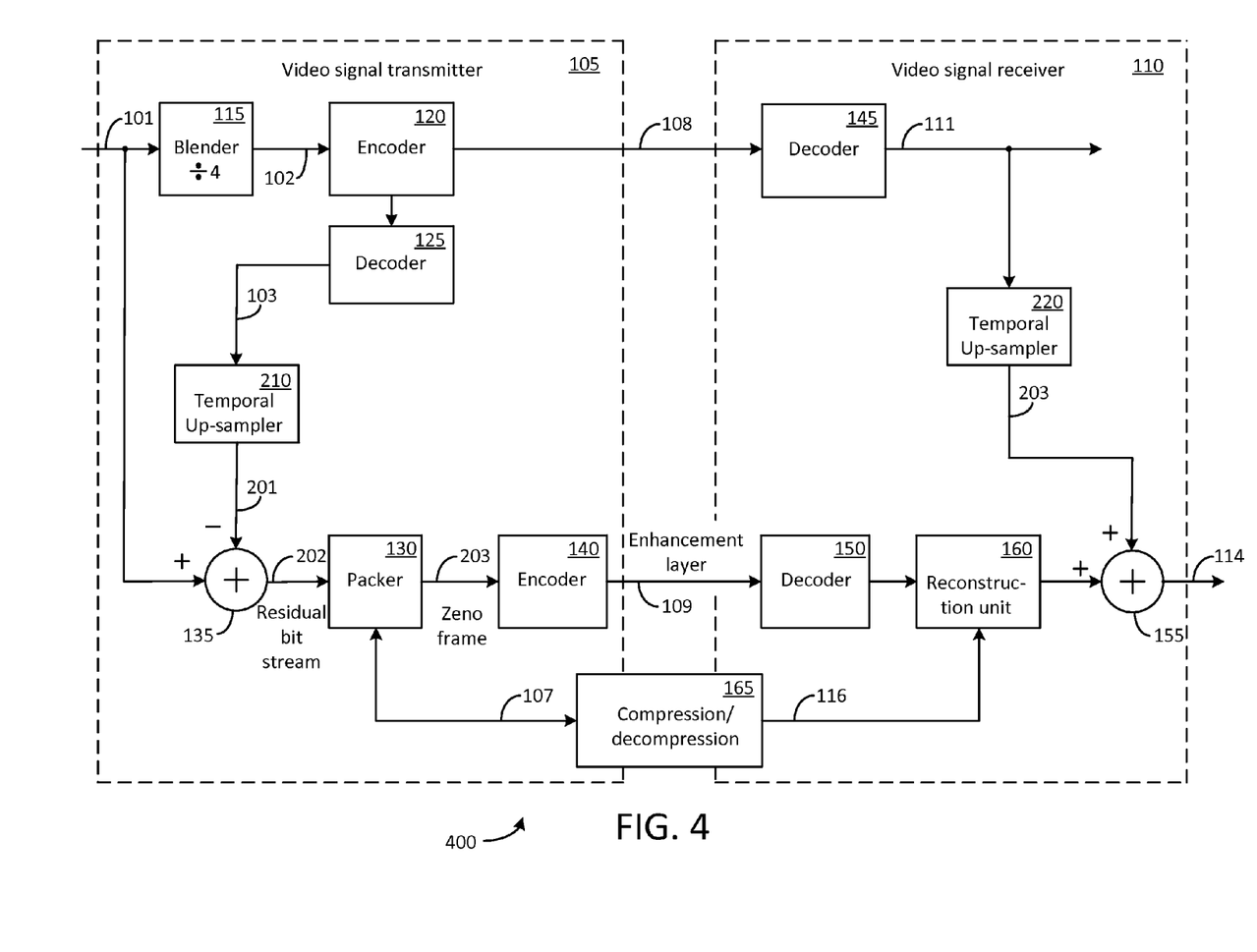
FIG. 4 shows a backward-compatible video system in accordance with a fourth embodiment of the invention.

FIG. 4 shows a backward-compatible video system 400 in accordance with a fourth embodiment of the invention. In this embodiment, the base layer is generated, propagated, and processed in the same manner as in the first and second embodiments described above.

As for the enhancement layer, the reconstructed blended frames signal (60 fps) produced by decoder 125 is up-sampled to 240 fps by up-sampler 210. Decoder 125 may be substantially similar to decoder 145 that is present in video signal receiver 110. Functionally, each of decoders 125 and 145 implements an inverse process (decoding) to the encoding process implemented in encoder 120.

The upsampling function can be carried out by repeating the 60 fps reconstructed blended frames signal every four frames, or by other suitable methods. Combiner/differentiator 135 outputs the difference between the upsampled reconstructed blended frames signal (240 fps) and the high frame-rate input signal (240 fps) obtained via line 101, as a residual bit stream signal at 240 fps on line 202. The residual bit stream signal is packed (by packer 130) for producing a residual Zeno frames signal on line 203. The residual Zeno frames signal is then encoded by encoder 140 and transmitted as the enhancement layer over transmission medium 109 to decoder 150 in the video signal receiver 110.

In video signal receiver 110, the low frame-rate blended frames signal (60 fps) on line 111 is upsampled to 240 fps by up-sampler 215 and provided to combiner 155. Combiner 155 also receives from reconstruction unit 160, a reconstructed residual Zeno frames signal at 240 fps. The two signals are combined in combiner 155 to generate the 240 fps high frame-rate video signal that is propagated out of video signal receiver 110 via line 114.

Figure 5:
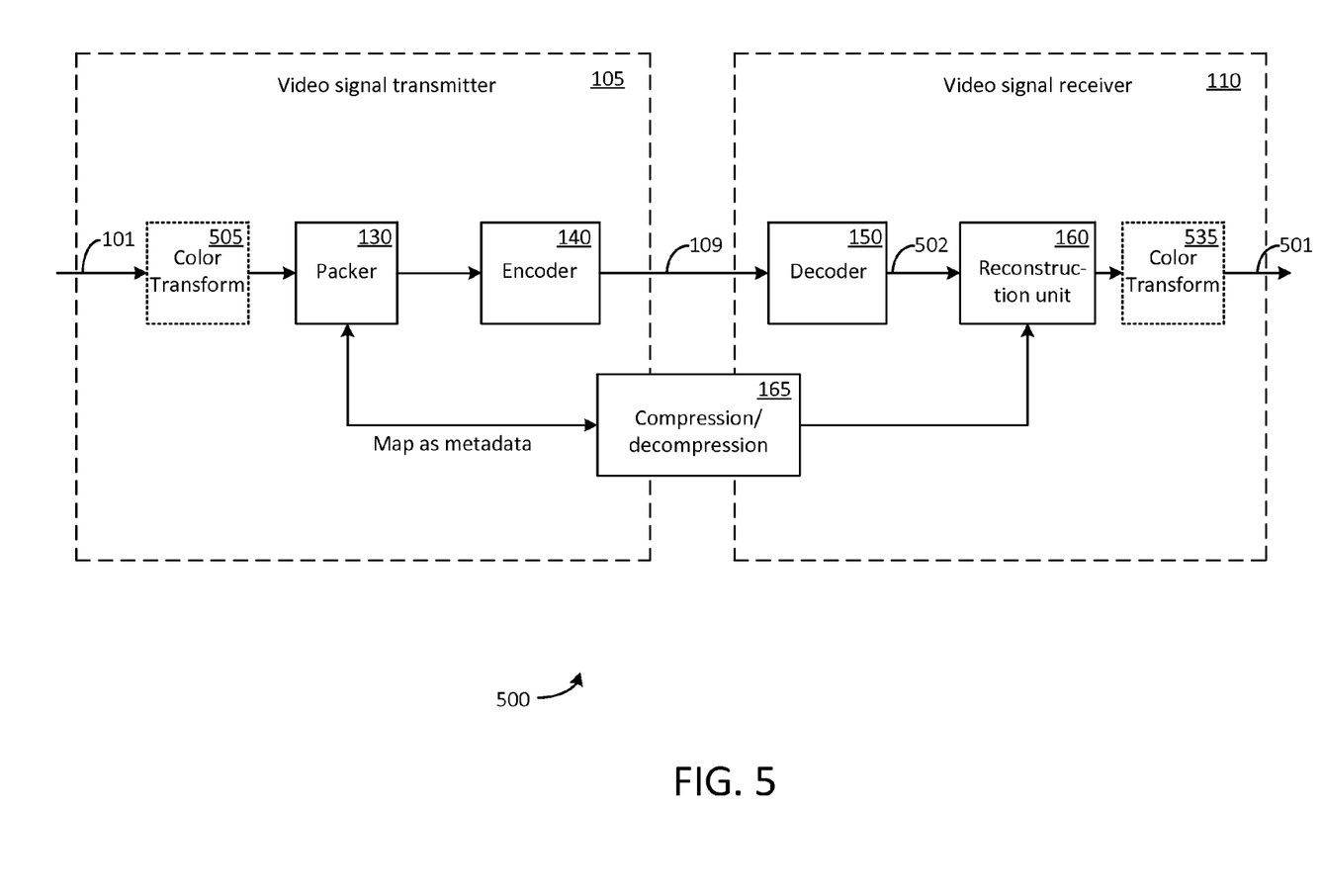
FIG. 5 shows a video system in accordance with a fifth embodiment of the invention, wherein the video system is directed at newer equipment and updated legacy equipment that accommodate high frame-rate applications, while providing a limited feature set to non-updated legacy equipment.

FIG. 5 shows a video system 500 in accordance with a fifth embodiment of the invention, wherein the video system is directed at newer equipment and updated legacy equipment that accommodate high frame-rate applications, while providing a limited feature set to non-updated legacy equipment. The high frame-rate input signal (240 fps) obtained via line 101 is provided to packer 130 after undergoing an optional color transforming procedure (shown by color transform 505). Packer 130 generates a 60 fps Zeno frames signal from the high frame-rate input signal (240 fps) and transmits this Zeno frames signal from video signal transmitter 105 via transmission medium 109 to video signal receiver 110. The 60 fps Zeno frames signal is decoded by decoder 150 in video signal receiver 110 and the decoded signal provided to reconstruction unit 160. Reconstruction unit 160 uses a decision map propagated from packer 130 (in the form of metadata in one example implementation) to reconstruct the high frame-rate signal (240 fps). If color transform 505 was implemented in video signal transmitter 105, the high frame-rate signal (240 fps) may be correspondingly color transformed in video signal receiver 110 via color transform 535. The output of color transform 535 is output on line 501 and can be provided to newer equipment that are designed to accommodate the high frame-rate video signal (240 fps). The output on line 501 may also be provided to updated legacy equipment, wherein the updating includes incorporation of reconstruction unit 160 and/or color transform 535. In legacy equipment that have not been updated, and more particularly, do not include reconstruction unit 160, the 60 fps Zeno frames signal available on line 502 may be used for display purposes, thereby providing a limited feature set availability to such non updated legacy equipment.

The methods and systems described herein may be implemented in hardware, software, firmware or combination thereof. Features described as steps, blocks (for example, the packer blocks and the blender blocks), modules, or components may be implemented together (e.g., in a logic device such as an integrated logic device) or separately (e.g., as separate connected logic devices). The software portion of the methods of the present disclosure may comprise a computer-readable storage medium in which is stored instructions that, when executed by a computer system, execute all or parts of the described methods. The computer-readable storage medium may comprise, for example, a random access memory (RAM) and/or a read-only memory (ROM). At least a portion of the instructions may be executed by a processor (e.g., a microprocessor, a microcontroller, a digital signal processor (DSP), or implemented as a hardware circuit in an application specific integrated circuit (ASIC), a standard logic integrated circuit, or a field programmable logic array (PLD, FPGA etc.)).

All patents and publications mentioned in the specification may be indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The examples set forth above are provided to give those of ordinary skill in the art a complete disclosure and description of how to make and use the embodiments of the enhancement methods for sampled and multiplexed image and video data of the disclosure, and are not intended to limit the scope of what the inventors regard as their disclosure. Modifications of the above-described modes for carrying out the disclosure may be used by persons of skill in the video art, and are intended to be within the scope of the following claims.

A number of embodiments of the disclosure have been described. Nevertheless, it will be understood that various modifications may be made without departing from the spirit and scope of the present disclosure. Accordingly, other embodiments are within the scope of the following claims.

What is claimed is:

1. A method of propagating a video signal, the method comprising:

providing a high frame-rate input video bit stream to a video signal transmitter;

generating from said high frame-rate input video bit stream, a first low frame-rate video bit stream, said first low frame-rate video bit stream comprising a blended frame that is generated by executing a blending process upon a plurality of frames of said high frame-rate video bit stream, wherein executing said blending process comprises calculating an average pixel value from a plurality of corresponding pixels in said plurality of frames of said high frame-rate video bit stream;

generating from said high frame-rate input video bit stream, a second low frame-rate video bit stream, said second low frame-rate video bit stream comprising a packed frame that is generated by executing a first packing process upon said plurality of frames of said high frame-rate video bit stream, wherein executing said first packing process comprises using a Zeno packing algorithm to generate a Zeno frame from said plurality of frames of said high frame-rate video bit stream;

deriving a secondary bit stream from said first low frame-rate video bit stream, wherein deriving said secondary bit stream from said first low frame-rate video bit stream comprises generating a reconstructed blended frame by decoding said base layer signal;

generating a residual video bit stream by comparing said secondary bit stream to said second low frame-rate video bit stream, wherein said comparing comprises determining a difference signal between said second low frame-rate video bit stream and said secondary bit stream;

encoding said first low frame-rate video bit stream to generate a base layer signal;

encoding said residual video bit stream to generate an enhancement layer signal; and transmitting said base layer signal and said enhancement layer signal out of said video signal transmitter.

2. The method of claim 1, further comprising:
generating a decision map by executing said first packing process, wherein the decision map provides spatial and temporal resolution information about the second low frame-rate video bit stream; and
transmitting said decision map out of said video signal transmitter.

3. The method of claim 2, further comprising:
generating a predicted Zeno frame by executing a second packing process upon said reconstructed blended frame.

4. The method of claim 3, wherein executing said second packing process comprises using said decision map generated by executing said first packing process.

5. The method of claim 3, further comprising:
generating a predicted Zeno frame by executing upon said reconstructed blended frame at least one of: a) a second packing process or b) a first temporal up-sampling function.

6. The method of claim 5, wherein executing said second packing process comprises:
temporally up-sampling said decision map generated by executing said first packing process; and
using the up-sampled decision map for executing said second packing process.

7. The method of claim 2, further comprising:
receiving in a video signal receiver, said base layer signal, said enhancement layer signal, and said decision map;

decoding said received base layer signal, the decoding comprising generating a received blended frame;

decoding said received enhancement layer signal, the decoding comprising generating a received residual bit stream; and reconstructing said high frame-rate input video bit stream in said video signal receiver by using two or more of: a) said received blended frame or a signal derived from said received blended frame, b) said received residual bit stream or a signal derived from said received residual bit stream, and c) the received decision map or a signal derived from the received decision map.

8. A video system comprising a video signal transmitter, the video signal transmitter comprising a first processing circuit that includes a processor, the first processing circuit configured for:

receiving a high frame-rate input video bit stream and generating therefrom, a first low frame-rate video bit stream, said first low frame-rate video bit stream comprising a blended frame that is generated by executing a blending process upon a plurality of frames of said high frame-rate video bit stream, wherein executing said blending process comprises calculating an average pixel value from a plurality of corresponding pixels in said plurality of frames of said high frame-rate video bit stream;

receiving said high frame-rate input video bit stream and generating therefrom, a second low frame-rate video bit stream, said second low frame-rate video bit stream comprising a packed frame that is generated by executing a first packing process upon said plurality of frames of said high frame-rate video bit stream, wherein executing said first packing process comprises using a Zeno packing algorithm to generate a Zeno frame from said plurality of frames of said high frame-rate video bit stream;

deriving a secondary bit stream from said first low frame-rate video bit stream, wherein deriving said secondary bit stream from said first low frame-rate video bit stream comprises generating a reconstructed blended frame by decompressing said base layer signal;

generating a residual video bit stream by comparing said secondary bit stream to said second low frame-rate video bit stream, wherein said comparing comprises determining a difference signal between said second low frame-rate video bit stream and said secondary bit stream;

compressing said first low frame-rate video bit stream to generate a base layer signal;

compressing said residual video bit stream to generate an enhancement layer signal; and transmitting said base layer signal and said enhancement layer signal out of said video signal transmitter.

9. The system of claim 8, wherein the first processing circuit is further configured for:
generating a decision map by executing said first packing process, wherein the decision map provides spatial and temporal resolution information about the second low frame-rate video bit stream; and
transmitting said decision map out of said video signal transmitter.

10. The system of claim 8 further comprising a video signal receiver, the video signal receiver comprising a second processing circuit that includes another processor, the second processing circuit configured for:
receiving a) said base layer signal in one of a compressed or an uncompressed format, b) said enhancement layer signal in one of a compressed or an uncompressed format, and c) said decision map in one of a compressed or an uncompressed format; and reconstructing said high frame-rate input video bit stream, in part, by executing an unpacking process using the received decision map.

11. A method of receiving a video signal, the method comprising:

receiving in a video signal receiver, an enhancement layer signal comprising at least one packed frame that is generated by executing a packing process upon a plurality of frames of a high frame-rate video bit stream, wherein executing said packing process comprises using a Zeno packing algorithm to generate a Zeno frame from said plurality of frames of the high frame-rate video bit stream;

receiving in the video signal receiver, a decision map that provides spatial and temporal resolution information of the at least one packed frame;

decoding the enhancement layer signal, the decoding comprising generating a residual bit stream;

reconstructing the high frame-rate input video bit stream in the video signal receiver, wherein the reconstructing comprises using at least two of: a) said residual bit stream, b) a signal derived from said residual bit stream, c) said decision map, or d) a signal derived from said decision map;

receiving in the video signal receiver, a base layer signal comprising at least one blended frame that is generated by executing a blending process upon said plurality of frames of said high frame-rate video bit stream, wherein executing said blending process comprises calculating an average pixel value from a plurality of corresponding pixels in said plurality of frames of said high frame-rate video bit stream; and decoding said base layer signal, the decoding comprising generating in said video signal receiver, a received blended frame.

12. The method of claim 11, wherein reconstructing said high frame-rate input video bit stream in said video signal receiver further comprises using at least one of a) said received blended frame or b) a signal derived from said received blended frame.

* * * * *